Patented Dec. 8, 1942

2,304,475

UNITED STATES PATENT OFFICE 2,304,475

HIGH MOLECULAR WEIGHT ALIPHATIC DIAMIDE OF SEBACIC ACID AND PROCESS OF PREPARING SAME

William O. Pool, Chicago, Ill., assignor to Armour and Company, Chicago, Ill., a corporation of Illinois No Drawing. Application October 20, 1939, Serial No. 300,474

4 Claims. (Cl. 260—561)

This invention relates to high molecular weight aliphatic diamides of sebacic acid and it comprises as new compounds aliphatic diamides of sebacic acid of the general formula:

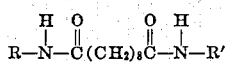

wherein R and R' are alkyl groups containing at least twelve carbon atoms; it further comprises processes wherein sebacic acid is reacted with primary aliphatic amines of relatively high molecular weight.

High molecular weight amides such as stearamide, palmitamide, etc., are of considerable commercial and technical interest because of their high melting points and chemical stability. They have been used for waterproofing fabrics, as paper sizes and protective coverings. All of these uses demand an inert, high melting, waxy substance. It is desirable that the melting point be above 100° C. in order to insure protecting the waxed surfaces against boiling water. Some of the amides such as stearamide are sufficiently high melting, the pure compound melts at 109° C., but the presence of impurities lowers the melting point in some cases considerably below 100° C. While pure stearamide is relatively easy to prepare in the laboratory the commercial preparation of the pure compound is quite difficult. There is, therefore, an important commercial demand for an inert, waxy substance of high melting point which can be cheaply and easily prepared and can be used as a substitute for expensive natural waxes, such as carnauba, in various protective coatings.

I have now discovered that certain new diamides of sebacic acid have waxy characteristics, remarkable chemical stability, and relatively high melting points. The diamides of my invention can be characterized as substances having the structural formula

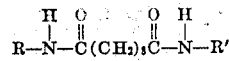

wherein R and R' are alkyl radicals containing at least twelve carbon atoms. When R and R' are of high molecular weight, as stated, the diamide has all of the properties desired in a wax for use in water-proofing fabrics, polishing furniture, and the like. Such diamides are quite insoluble in alcohol, carbon tetrachloride, water and benzene, but are soluble in boiling xylene from which they will precipitate rapidly on cooling. They are also highly resistant to hydrolysis with alcoholic potassium hydroxide solutions and thus are stable against ordinary alkalis found in detergents.

In addition to the desirable properties possessed by the diamides of the present invention, I have discovered that they may be readily prepared by simply reacting one mole of sebacic acid with two moles of a primary aliphatic amine. Such amines will ordinarily contain at least twelve carbon atoms, but insofar as the process of the present invention is concerned it is equally applicable to the preparation of diamides from aliphatic amines having from six to twelve carbon atoms.

I shall now give examples of how the present invention may be practised.

EXAMPLE 1

*N,N'-diododecyl sebacamide*

One mole (202 parts by weight) of sebacic acid are mixed with 2 moles (370 parts by weight) of n-dodecyl amine. The mixture is heated at 180° C. until water ceases to be evolved. The product, N,N'-didodecyl sebacamide, is a hard, waxy solid which melts sharply at 141° C. It is insoluble in alcohol, carbon tetrachloride, water and benzene but is soluble in boiling xylene.

EXAMPLE 2

*N,N'-dioctadecyl sebacamide*

One mole (202 parts by weight) of sebacic acid are mixed with 2 moles (538 parts by weight) of octadecyl amine. The mixture is heated until the evolution of water ceased. The product, N,N'-dioctadecyl sebacamide, is a hard, waxy solid which melts at 139° C.

EXAMPLE 3

One mole (202 parts by weight) of sebacic acid are mixed with 500 parts by weight of high molecular weight primary amines prepared by hydrogenating high molecular weight nitriles derived from fatty acids of hydrogenated fish oil. These amines will contain primary amines having from ten to eighteen carbon atoms, together with small amounts of primary amines having an even higher number of carbon atoms. The mixture is heated to 180° C. until water ceases to be evolved and the reaction product is a hard, waxy solid melting at 137° C. The solubility of the diamide thus prepared is similar to that of products prepared in Examples 1 and 2.

The preparation of these diamides from hydrogenated high molecular weight nitriles is important commercially since high molecular weight nitriles can be readily prepared from complex mixtures of naturally occurring fatty acids, and these nitriles can in turn be readily hydrogenated to give amine mixtures. The final diamide of sebacic acid is undoubtedly composed of a plurality of diamides having from about ten to eighteen carbon atoms. The actual structure of the diamide will depend on the relative proportions of various primary amines in the amine starting material.

The above examples illustrate the process of the present invention and it will be apparent to those skilled in the art that other primary amines having from six to eighteen carbon atoms in the alkyl group can be used for the preparation of sebacic acid diamides.

In every case the reaction mixture need be heated to a temperature just sufficient to insure the evolution of water from the reaction mixture. A temperature of about 180° C. is suitable, but temperatures above and below this may be used.

Having thus described my invention, what I claim is:

1. A diamide having the formula:

$$RHNCO(CH_2)_8CONHR'$$

wherein R and R' are alkyl groups each containing at least twelve carbon atoms.

2. N,N'-didodecyl sebacamide.
3. N,N'-dioctadecyl sebacamide.
4. The process of preparing N alkyl substituted high molecular weight diamides of sebacic acid which comprises heating a mixture of primary aliphatic monoamine containing at least twelve carbon atoms and sebacic acid.

WILLIAM O. POOL.